United States Patent
Couturier

(10) Patent No.: US 7,054,425 B2
(45) Date of Patent: May 30, 2006

(54) MODULAR SYSTEM FOR MANAGING SERVICE CALLS, IN PARTICULAR TELECOMMUNICATION SERVICE CALLS

(75) Inventor: Alban Couturier, Chatillon (FR)

(73) Assignee: Alcatel, Paris (FR)

( * ) Notice: Subject to any disclaimer, the term of this patent is extended or adjusted under 35 U.S.C. 154(b) by 152 days.

(21) Appl. No.: 09/816,465

(22) Filed: Mar. 26, 2001

(65) Prior Publication Data

US 2001/0026615 A1    Oct. 4, 2001

(30) Foreign Application Priority Data

Mar. 30, 2000  (FR) .................................. 00 04019

(51) Int. Cl.
*H04M 3/00* (2006.01)
*H04M 3/42* (2006.01)

(52) U.S. Cl. .................. 379/201.03; 379/196; 379/242; 379/269

(58) Field of Classification Search .......... 379/201.01, 379/201.02, 201.03, 201.04, 201.12, 207.02, 379/219, 220.01, 230, 242, 268, 269, 284, 379/196, 197, 198

See application file for complete search history.

(56) References Cited

U.S. PATENT DOCUMENTS

| | | | | |
|---|---|---|---|---|
| 5,323,452 A | * | 6/1994 | Dickman et al. | 379/201.04 |
| 5,717,747 A | * | 2/1998 | Boyle et al. | 379/201.03 |
| 6,201,862 B1 | * | 3/2001 | Mercouroff et al. | 379/230 |
| 6,317,428 B1 | * | 11/2001 | Mercouroff et al. | 370/360 |

OTHER PUBLICATIONS

Corbamed: "corbamed/99-04-044 Resource Access Decision", Apr. 26, 1999, Object Management Group XP002153807.

* cited by examiner

*Primary Examiner*—Harry S. Hong
(74) *Attorney, Agent, or Firm*—Sughrue Mion, PLLC

(57) ABSTRACT

A system for managing service calls, including access control modules implementing service access control mechanisms, the system further including master modules each associated with a service, with a set of access control modules and with a set of call processing modules, the system including: a receiver for receiving the calls, a sender for sending information relating to each of the calls to the set of access control modules, a decider for deciding to accept calls on the basis of data received from the set of access control modules, and a sender for sending second information relating to each of the calls to the set of call processing modules if the call has been accepted.

9 Claims, 2 Drawing Sheets

FIG_1
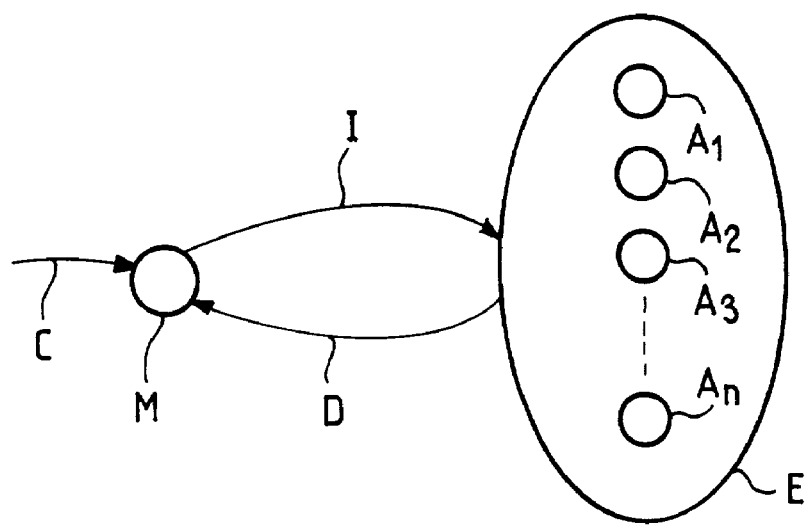
FIG_2
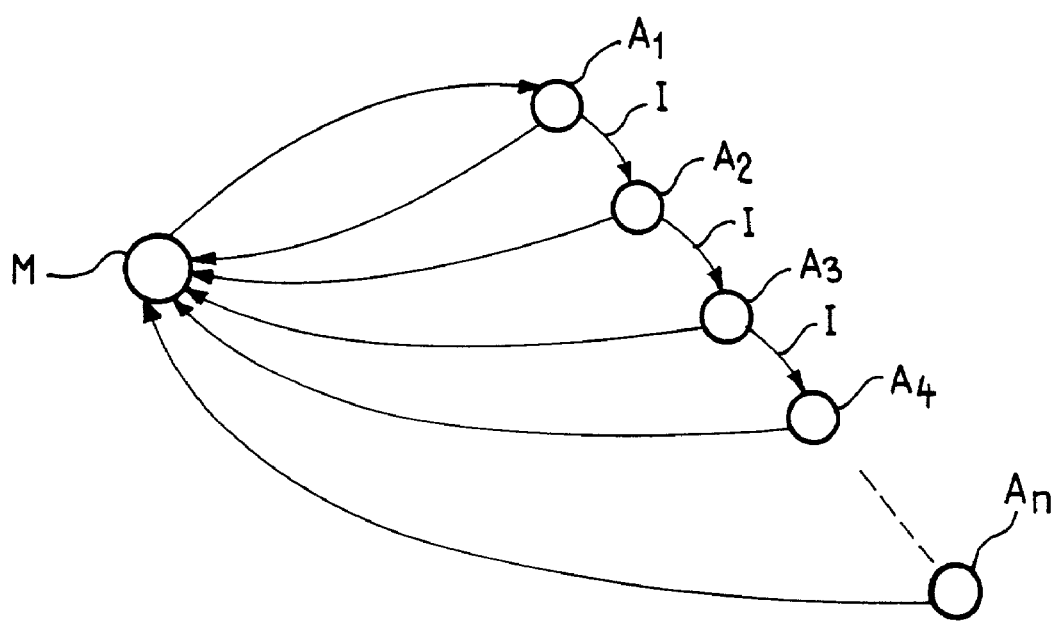

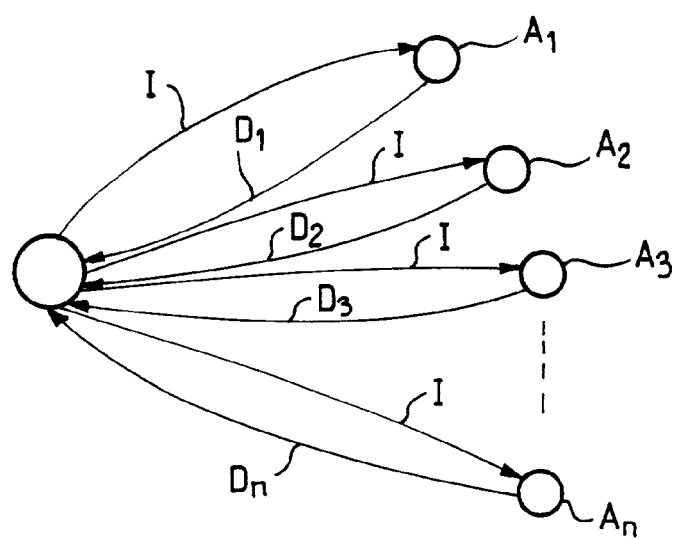
FIG_3
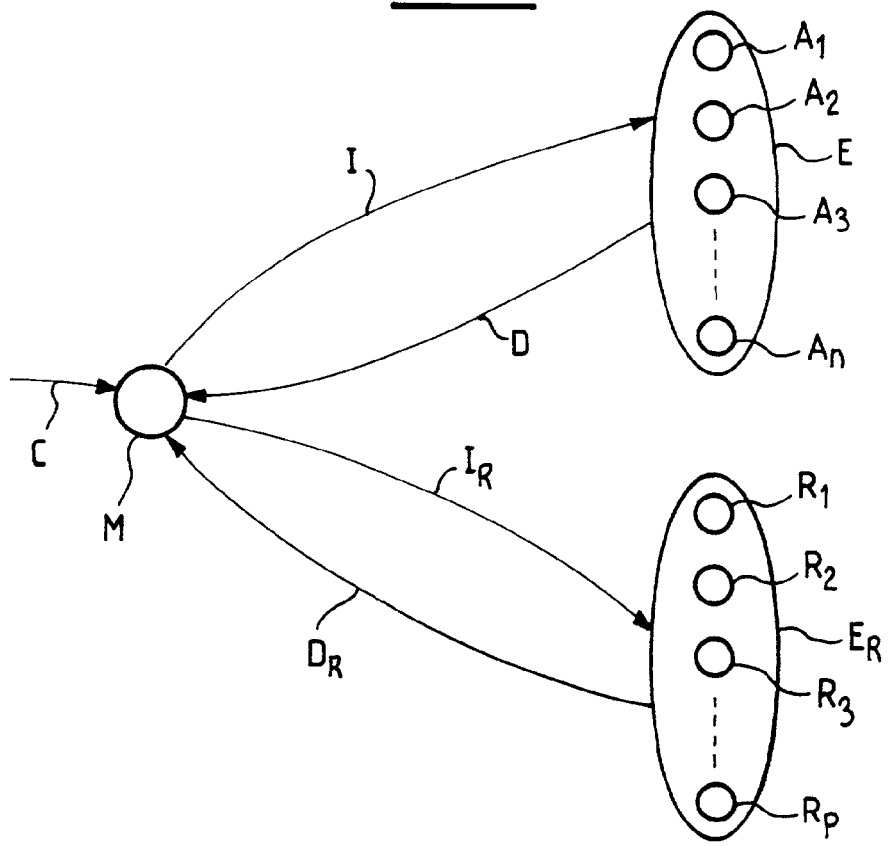
FIG_4

MODULAR SYSTEM FOR MANAGING SERVICE CALLS, IN PARTICULAR TELECOMMUNICATION SERVICE CALLS

The present invention relates to a system for managing service calls, in particular telecommunication service calls. Examples of telecommunication services are setting up a call with a subscriber, either via a conventional telecommunication network or via the Internet (Voice over IP—VoIP), and setting up a teleconference or videoconference, a private network (Virtual Private Network—VPN), a call with special billing arrangements (to a toll-free number, for example), etc.

BACKGROUND OF THE INVENTION

The invention finds an application in intelligent network architectures, for example. In intelligent network architectures, or in any other sophisticated telecommunication architecture, the use of service access control mechanisms as filters based on the identity of the caller, the geographical area of the caller or the time of the call is known in the art. It is also possible to implement call forwarding, either unconditionally or conditionally on the identity of the caller, the geographical area of the caller, the time of the call, etc. Clearly it is not possible to provide an exhaustive list of access controls.

Each service can use one or more access controls. A description of each service is therefore needed in terms of the access controls that it wishes to use.

In the case of basic telephony in particular, it is necessary to provide a description of the access controls that each telecommunication network user wishes to use.

It is also necessary to be able to add new access controls and to modify existing access controls, in particular to improve them.

For example, at a given time a user may decide to add a filter mechanism based on the identity of the caller because of repetitive nuisance calls from a particular caller.

At present, access controls are generally coded within a service call management system in a static form. To be more precise, the supplier of the system ships a complete platform with no facility for evolution. Accordingly, if there were no provision for it from the outset, installing a new access control would be costly because it would make it necessary to redevelop part of the system.

What is more, the suppliers of the software modules implementing the access controls are not necessarily the same as the suppliers of the architecture for executing the modules, and the resulting interworking generates a high additional cost.

A second prior art solution consists of describing the behavior of the system for each user (or more generally for each service) in a description language such as CPL (Call Processing Language). The description of each user can invoke each existing access control, and adding a new access control entails modifying the description of the users concerned so as to invoke the new access control.

This solution is no more satisfactory, however, since by its very nature a description language offers only limited possibilities and does not cater for the most advanced services.

For example, a language like CPL cannot invoke a database directly or invoke software modules developed in another language, i.e. software components that can execute autonomously (for example code compiled or interpreted by a Java virtual machine).

OBJECT AND SUMMARY OF THE INVENTION

The object of the invention is therefore to solve the above problems by proposing a powerful and adaptable system. It consists in a system for managing service calls, including access control modules implementing service access control mechanisms, which system further includes master modules. Each master module is associated with a service, with a set of access control modules and with a set of call processing modules, and includes:
- means for receiving the service calls,
- means for sending information relating to each of the calls to the set of access control modules,
- means for deciding to accept calls on the basis of data received from the set of access control modules, and
- means for sending second information relating to each of the calls to the set of call processing modules if said call has been accepted.

The system according to the invention can also be applied to any architecture outside the world of telecommunications and in which it is possible to distinguish between access to the service and processing as such.

One example of this is the management of any complex system (production line, nuclear power station, etc.). In the field of telecommunications, the invention can also apply to telecommunication management networks (TMN) as defined by the M.3000 series standards issued by the ITU-T (International Telecommunication Union, Telecommunication part).

The invention also provides a method of managing service calls, which method comprises the following steps in order:
- reception of a call by a master module,
- sending by said master module of information relating to the call to a set of access control modules,
- taking of decisions by the access control modules on the basis of the information relating to the call,
- sending of at least one of those decisions from the set of access control modules to the master module,
- taking of a final decision by the master module according to that at least one decision, and
- sending of second information relating to the call to a set of call processing modules if the call has been accepted.

The invention finally provides a method of adding a new access control module and/or a new call processing module dynamically to a service call management system, the method consisting in sending a message to the master module containing an identifier of the new access control module and/or the new call processing module to be added.

BRIEF DESCRIPTION OF THE DRAWINGS

The invention and its advantages will emerge more clearly in the course of the following description, which is given with reference to the accompanying drawings.

FIG. 1 is a general block diagram of a system according to the invention.

FIG. 2 shows a first embodiment of the invention.

FIG. 3 shows a second embodiment of the invention.

FIG. 4 is a diagram showing implementation of the invention with call processing modules.

MORE DETAILED DESCRIPTION

FIG. 1 is a block diagram of the general structure of one embodiment of a system according to the invention.

In FIG. 1, a master module M receives services calls C from a network T. On receiving each call C, it sends information I relating to that call to a set E of access modules $A_1, A_2, \ldots, A_n$. The access control modules are entities, for example software entities, each of which implements an access control mechanism, as previously referred to, i.e. typically call forwarding, filtering, etc.

The master module includes means for deciding to accept a call according to data D received from the access control modules.

In one embodiment of the invention the data D represents one or more of the following partial decisions:
  Accept the call,
  Reject the call,
  No decision.

Partial Decisions Taken by the Access Control Modules

In a preferred embodiment of the invention, each access control module is able to take a partial decision concerning each call received independently of other partial decisions taken by other access control modules. This approach makes the access control modules independent of each other and the system is therefore a modular system.

An access control module takes a partial decision to accept a call if the call must be accepted independently of the decisions taken by other access control modules. For example, in an application of the invention to the field of telecommunications, a user may require that a particular party (for example their partner) be able to contact them at anytime. A call from the specified party must therefore be accepted.

In this case, the access control module corresponding to a "priority list" mechanism takes an "Accept the call" decision, which means that it is not necessary to interrogate the other access control modules in order to take a final decision to accept the call.

An access control module takes a "Reject the call" decision if a call must be rejected independently of the decisions of the other access control modules. For example, an access control module that applies filtering based on geographical areas takes a "Reject the call" decision if a call arrives from a geographical area that is filtered.

In all other cases, the access control modules take "No decision" decisions, which mean that they are not in a position either to accept the call unconditionally or to reject it.

This applies, for example, when a caller does not belong to a proscribed area and the access control module applies filtering based on the geographical areas of callers. The module can neither reject the call nor accept it, because the fact that the call is not excluded by its own filter does not mean that it is not excluded by other filters implemented by other access control modules.

There are various ways to organize the access control modules and have them co-operate to arrive at a consensus.

Chain Organization

FIG. 2 shows a first way of organizing the scheduling of calls between a master module M and all the access control modules $A_1, A_2, \ldots, A_n$ associated with it.

In this embodiment the access control modules are organized into a chain.

Initially, the master module sends information I relating to the call to the first access control module $A_1$ of the chain. If the first access control module takes an "Accept the call" or "Reject the call" decision $D_1$, it sends it to the master module. Otherwise ("No decision"), it sends the information relating to the call to the second access control module of the chain, and so on.

The last access control module sends its decision $D_n$ to the master module regardless of the nature of the decision. The master module includes means for taking a final decision based on a decision that it has received from one of the access control modules. Note that in this particular embodiment it can receive only one decision.

If the decision received is an "Accept the call" or "Reject the call" decision, the final decision is the same. If the decision received is a "No decision" decision, then the final decision is to accept the call.

Star Organization

FIG. 3 shows another way of scheduling calls between a master module M and all of the access control modules $A_1, A_2, \ldots, A_n$ associated with it.

In this embodiment the access control modules are organized in a star, i.e. they send their decisions $D_1, D_2, D_3 \ldots, D_n$ to the master module regardless of the nature of the decision.

A first way to implement this embodiment entails sending the information relating to the call to all the access control modules in parallel. The access control modules process the call concurrently and then send their decision to the master module.

A second way entails sending the information relating to the call to a first access control module $A_1$ and waiting for its decision in order, where applicable, to send the information to a second access control module $A_2$, and so on.

This second embodiment minimizes exchanges between the master module and the access control modules but requires more processing time, except in unusually favorable situations.

Conflict Management

It is possible for access control modules to take contradictory decisions. For example, if a priority call mechanism and a rejection mechanism based on time periods are implemented, the same call may be the subject of an "Accept the call" decision and a "Reject the call" decision.

The apparent conflict can be resolved by priority considerations, i.e. by deciding on an order of relative importance of the decisions taken by the various access control modules.

In the case of an embodiment in the form of a chain, the rank of the access control module (i.e. its position within the chain) corresponds directly to its priority.

The same applies to an embodiment in which the access control modules are organized as a star if the master module sends the information relating to the call sequentially, i.e. after receiving a decision, as previously described.

In the above two situations access control modules having a high priority are in a position to take decisions before access control modules having a lower priority have been interrogated. This avoids conflicts.

In the case of a "star" embodiment in which the information relating to the call is sent in parallel, the master module can receive two contradictory decisions. It is therefore necessary to associate a priority, for example a number, with each access control module, and the priorities can be stored in a table in the master module.

Alternatively, it is equally possible to use a voting system, whereby the master module counts the numbers of "Accept the call" and "Reject the call" decisions and takes its final decision on the basis of those numbers.

Implementing and Dynamically Adding New Modules

In one embodiment of the invention the various master and access control modules can be implemented in accordance with the CORBA (Common Object Request Broker Architecture) specifications of the OMG (Open Management Group). In this case the various modules communicate decisions, information relating to calls, etc. via a software bus called the ORB (Object Request Broker) to which the modules are connected.

One property of CORBA is that new software elements can be connected dynamically to the software bus and made known to software elements previously connected. It is therefore possible to add new access control modules dynamically without it being necessary to recompile the system or even stop it. This embodiment of the invention, although greatly facilitated by the contribution of CORBA or other environments of the same type (such as Microsoft's DCOM), can be implemented regardless of the underlying technical environment.

Generally speaking, it is sufficient for the master module to have means for receiving requests to add new access control modules and to include them in the set of access control modules with which it is associated.

The priorities assigned to the access control modules for a telephone service can be divided into groups:
- a "company" group,
- a "user" group.

Thus a user can add new access control modules (for example call forwarding or a priority list), but the system systematically assigns them a lower priority than those of the "company" group, which implement global recommendations for the whole of a site or a company.

Call Processing Modules

In one embodiment of the invention the system also includes a set of call processing modules which are responsible for providing access to the requested service correctly.

In the context of an application of the invention to the field of telecommunications, the call processing modules can, for example:
- use algorithms to route calls across a network to a requested service or user, bill the calls, etc.
- set parameters of the call in accordance with preferences such as the codecs used, the quality of service, the final address of the call (telephone number, IP (Internet Protocol) address, port number, ATM (Asynchronous Transfer Mode) virtual circuit number, protocol name (SIP, H.323, etc.), call type (video, audio, voice, etc.), etc.
- offer services such as reproducing a pre-recorded announcement, adding a third party to the call, etc.
- manage the call after it is set up, to change the aforementioned parameters during the call.

In this embodiment, once a call has been accepted, the master module can send information relating to the call to a set of call processing modules so that the call is correctly routed in the network, billed, etc.

FIG. 4 shows this embodiment.

On receiving a call, the master module sends information I relating to the call to the set E of access control modules $A_1, A_2, A_3, \ldots, A_n$. It then receives one or more decisions from the set $E_A$ and decides to accept or reject the call concerned, as previously explained.

The master module can then send information $I_R$ relating to the call to the set $E_R$ of call processing modules $R_1, R_2, R_3, \ldots, R_p$. The information $I_R$ can be identical to or different from the information I sent to the access control modules.

The master module can then receive one or more decisions $D_R$ from the set and, where applicable, take a final decision based on the aforementioned decision(s), which can concern routing, billing, etc.

Just like the access control modules, the call processing modules can be added dynamically, in particular by exploiting the CORBA principles. The master module can therefore include means for receiving requests to add new call processing modules and include them in the set of call processing modules with which it is associated.

Determining the Call Processing Module

In one embodiment of the invention an access control module sends out an identifier of the call processing module that it has decided must process the call at the same time as an "Accept the call" decision. To increase the modularity of the system, the control modules can know in what way the call processing modules are specialized.

However, in another embodiment, the master module has an a priori knowledge of the associations between the access control modules and the call processing modules, i.e. it is not necessary for the former to send the identifier of one of the latter.

Reverting to the example of a telecommunication system, each access control module is associated with one or more call processing modules. For simplicity, it is assumed that the call processing modules are responsible only for routing calls.

When an access control module takes an "Accept the call" decision, it sends the master module the decision and a call processing module identifier. The master module can then dialogue with the call processing module in order to determine the number of the called party.

For example, if an access control module manages a call forwarding filter, it can send an "Accept the call" decision, indicating which call processing module is able to forward the call by assigning the correct route in the network.

The invention claimed is:

1. A system for managing service calls, including access control modules implementing service access control mechanisms, the system further including master modules each associated with a service, with a set of access control modules and with a set of call processing modules, the system including:
    means for receiving said calls,
    means for sending information relating to each of said calls to said set of access control modules,
    means for deciding to accept said calls on the basis of data received from said set of access control modules, and
    means for sending second information relating to each of said calls to said set of call processing modules if said call has been accepted.

2. A system according to claim 1, wherein said access control modules include means for emitting "Accept the call", "Reject the call" and "No decision" decisions.

3. A system according to claim 2, wherein said means for taking decisions send "Accept the call" and "Reject the call" decisions to said master module.

4. A system according to claim 3, wherein said means for taking decisions send "No decision" decisions to said master module.

5. A system according to claim 3, wherein said access control modules are organized in a chain, said means for taking decisions of the last call control module of said chain are adapted to send decisions to said master module, and the other access control modules include means for sending said information relating to the call to the subsequent access control modules.

6. A system according to claim 1, wherein each master module further includes means for receiving requests to add new access control modules and for including them in the set of access control modules with which it is associated.

7. A system according to claim 1, wherein each master module further includes means for receiving requests to add new call processing modules and for including them in the set of call processing modules with which it is associated.

8. A method of automatically managing service calls by means of an information processing system, the method comprising the following steps in order:
   reception of a call by a master module,
   sending by said master module of information relating to said call to a set of access control modules,
   taking of decisions by said access control modules on the basis of said information relating to said call,
   sending of at least one of said decisions from said set of access control modules to said master module,
   taking of a final decision by said master module according to said at least one decision, and
   sending of second information relating to the call to a set of call processing modules if said call has been accepted.

9. A method of adding a new access control module and/or a new call processing module dynamically to a service call management system comprising at least one master module for making decisions on call handling based on at least one decision by an access control module and/or call processing modules in a set of modules with which said master module is associated, the method comprising sending a message to said master module containing an identifier of said new access control module and/or said new call processing module, and said master module responding to said request by including said new access control and/or call processing module in said set.

* * * * *